(12) United States Patent
Kinoshita

(10) Patent No.: US 7,131,670 B2
(45) Date of Patent: Nov. 7, 2006

(54) FOREIGN MATTER REMOVING DEVICE

(75) Inventor: Yoichi Kinoshita, Saitama (JP)

(73) Assignee: Komatsu Ltd., Tokyo (JP)

( * ) Notice: Subject to any disclaimer, the term of this patent is extended or adjusted under 35 U.S.C. 154(b) by 85 days.

(21) Appl. No.: 10/894,749

(22) Filed: Jul. 19, 2004

(65) Prior Publication Data

US 2005/0040695 A1 Feb. 24, 2005

(30) Foreign Application Priority Data

Aug. 7, 2003 (JP) ............................ 2003-288342

(51) Int. Cl.
*B60S 1/68* (2006.01)
*B60B 11/00* (2006.01)
(52) U.S. Cl. ..................... 280/856; 280/855; 301/36.3
(58) Field of Classification Search ............... 301/36.3; 280/855, 856; 305/100, 107, 110
See application file for complete search history.

(56) References Cited

U.S. PATENT DOCUMENTS

| | | | | |
|---|---|---|---|---|
| 2,738,986 A | * | 3/1956 | Pelton | 280/856 |
| 2,799,515 A | * | 7/1957 | Lobozzo | 280/855 |
| 2,823,928 A | * | 2/1958 | Dahlstrom | 280/856 |
| 2,839,313 A | * | 6/1958 | Walko | 280/856 |
| 3,464,714 A | * | 9/1969 | Prillinger | 280/855 |
| 3,788,668 A | * | 1/1974 | Perger | 280/851 |
| 3,913,943 A | * | 10/1975 | Tamburino et al. | 280/856 |
| 4,206,825 A | * | 6/1980 | van der Lely | 180/329 |
| 4,818,040 A | * | 4/1989 | Mezzancella et al. | 305/107 |
| 5,188,394 A | * | 2/1993 | Roche et al. | 280/856 |

FOREIGN PATENT DOCUMENTS

| JP | 4-118853 U | 10/1992 |
|---|---|---|
| JP | 11-043022 A | 2/1999 |

* cited by examiner

Primary Examiner—Jason R. Bellinger
(74) Attorney, Agent, or Firm—Frishauf, Holtz, Goodman & Chick, P.C.

(57) ABSTRACT

A foreign matter removing device which is capable of reliably removing foreign matter from between a double tire includes at least one foreign matter removing member interposed in a space of at least one double tire. A dimension in a width direction of the foreign matter removing member in a vicinity of a tip end portion thereof is larger than a dimension in a diameter direction from an outer peripheral portion of a hub, on which the double tire is fitted, to an outer peripheral portion of a rim of at least the one double tire.

4 Claims, 14 Drawing Sheets

F I G. 5
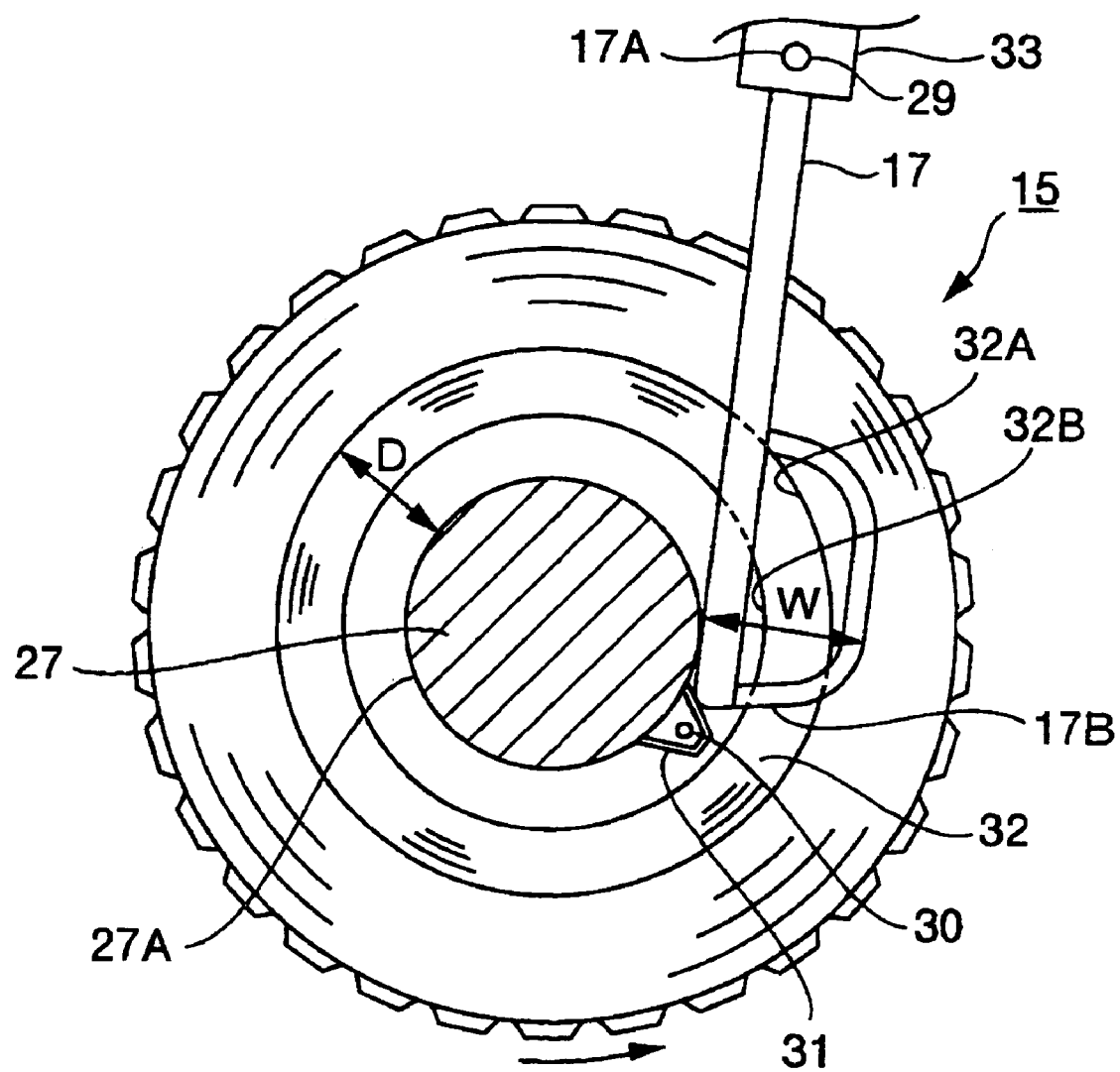

F I G. 8
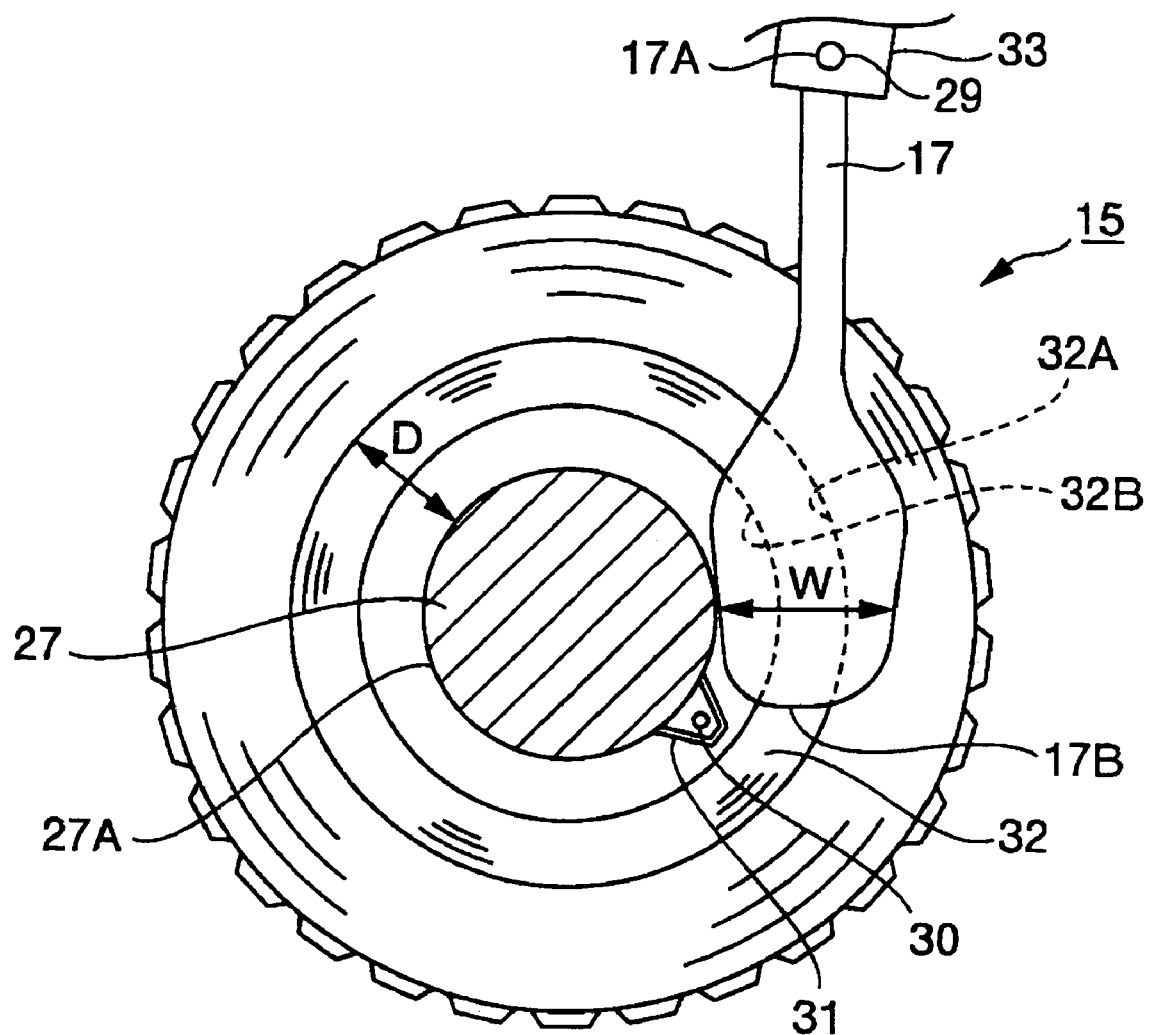

F I G. 9
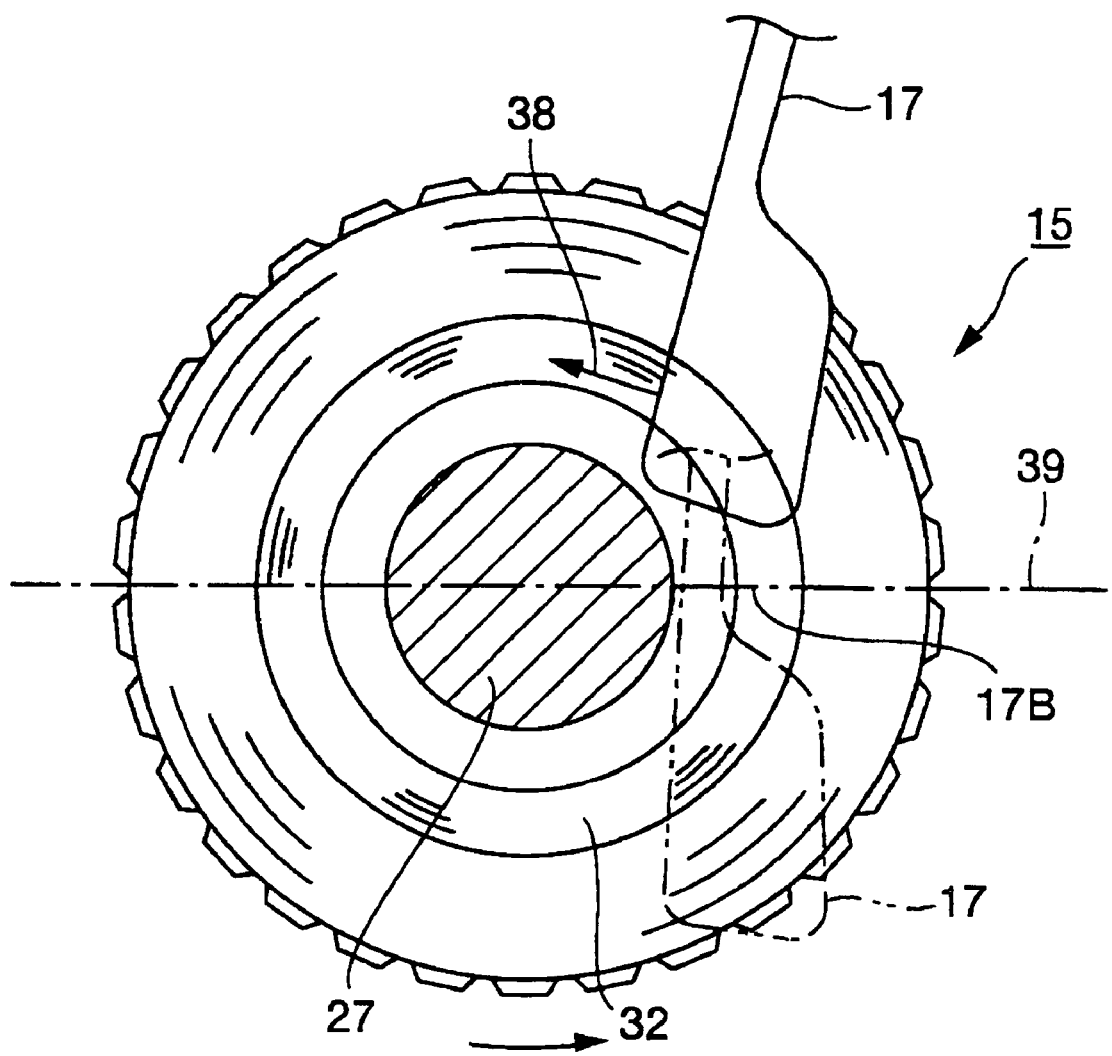

FOREIGN MATTER REMOVING DEVICE

TECHNICAL FIELD

The present invention related to a foreign matter removing device for removing foreign matters caught in a space of a double tire.

BACKGROUND ART

A foreign matter removing device for removing foreign matters such as stones, which are caught in a space of a double tire, is conventionally known (for example, see Japanese Patent Application Laid-open No. 11-43022). FIG. 11 and FIG. 12 show an essential part of a vehicle to which a foreign matter removing device disclosed in Japanese Patent Application Laid-open No. 11-43022 is mounted. As shown in FIG. 11, a double tire 12 is what is formed by arranging two tires (hereinafter, called an outer tire 15 and an inner tire 14) at an end portion of a shaft 21 in parallel via a spacer 19 or the like so as to have a predetermined gap. In a working vehicle 11 having the double tire 12, foreign matters such as gravel are sometimes caught between the outer tire 15 and the inner tire 14. Such foreign matters sometimes damage side surfaces of the tires 14 and 15 by pressing them, and cause breakage.

In FIG. 11 and FIG. 12, a foreign matter removing member 17 in a plate shape for removing foreign matters is fixed to a vehicle body 20 of the working vehicle 11 to face downward so as to pass through the space of the double tire 12. The foreign matters caught in the space of the double tire 12 are rotated with the double tire 12, and hit against the foreign matter removing member 17 and sprung, and fall off from the space of the double tire 12.

As shown in FIG. 13, there is known a foreign matter removing device in which two plate-shaped foreign matter removing members 17 are formed into a shape in which two members are widely opened at lower portions and fixed to the vehicle body 20 (for example, see Japanese Utility Model Laid-open No. 4-118853). The foreign matter removing members 17 are rotatable via a pin 29. The foreign matters caught in the space of the double tire 12 hit against the foreign matter removing members 17 and are sprung out.

However, the above-described prior arts have the problems as described below. In each of the prior arts, the foreign matter removing member 17 extends to the vicinity of the spacer 19 and the shaft 21 perpendicularly to the center of the shaft 21 of the double tire 12 from above. Accordingly, when the vehicle body 20 moves up and down with respect to the double tire 12, the foreign matter removing member 17 collides against the spacer 19 and the shaft 21, and there is the possibility that any of them is damaged. Namely, the art described above is suitable for the working vehicle 11 which makes comparatively small vertical motion as, for example, a folk lift, but it is difficult to use the art in the working vehicle 11 which makes large vertical motion as a dump truck.

In view of the above, there is known a foreign matter removing device which will be explained hereinafter, as the foreign matter removing device for the working vehicle 11 with large vertical motion such as a dump truck. As shown in FIG. 14, the double tires 12 are mounted to hubs 27 provided at both end portions of a rear axle 25 including a rear differential at a central portion. A frame 26 of the vehicle body 20 is supported from the rear axle 25 by rear suspensions 23 and 23 and a link (not shown). A body 16 (also called a vessel) which is capable of being raised and lowered from the frame 26 by a dump cylinder (not shown) is loaded on an upper part of the vehicle body 20.

Base end portions 17A of plate-shaped foreign matter removing members 17 (hereinafter, called stone removing rods 17) are fixed to a lower part of the body 16 of the dump truck 11 with pins. 29 to be rotatable in a traveling direction of the dump truck. Tip end portions 17B of the stone removing rods 17 are inserted in the spaces of the double tires 12, and are located at rear positions from the hubs 27. As a result, the foreign matters caught in the spaces of the double tires 12 hit against the stone removing rods 17 from behind and are sprung out of the spaces of the double tires 12.

However, even the foreign matter removing device using the stone removing rod 17 as above has the following problems. As shown in FIG. 15 and FIG. 16, the stone removing rod 17 is rotatable in a traveling direction of the dump truck, and when it is swung the furthest forward, its tip end portion 17B contacts an outer peripheral portion of the hub 27. At this time, the tip end portion 17B of the stone removing rod 17 slips in between an outer peripheral portion 27A of the hub 27 and an inner peripheral portion 32B of a rim 32, between the inner peripheral portion 32B of the rim 32 and an outer peripheral portion 32A of the rim 32, or between the outer peripheral portion 27A of the hub 27 and the outer peripheral portion 32A of the rim 32, and cannot get out of there. In the explanation below, these situations are collectively expressed by the description that the stone removing rod 17 slips into an inside of the rim 32.

As a result, with the rotation of the tires 14 and 15, a force is exerted on the stone removing rod 17 from the rim 32 and the hub 27, and the stone removing rod 17, the rim 32, the hub 27 or the like is sometimes broken. Further, when the dump truck causes oscillation in the state in which the tip end portion 17B of the stone removing rod 17 slips in, it sometimes happens that the stone removing rod 17 is twisted and broken.

As shown in FIG. 14 to FIG. 16, an air pipe 30 for supplying air is connected to the inner tire 14. The air pipe 30 passes between the inner tire 14 and the outer tire 15 approximately in parallel with the hub 27. A cover 31 for protecting the air pipe 30 is provided between the inner tire 14 and the outer tire 15. When the double tire 12 is rotated in the state in which the stone removing rod 17 slips into the inside of the rim 32, the cover 31 sometimes collides against the stone removing rod 17. As a result, the stone removing rod 17, the cover 31 or the rim 32 is sometimes broken.

The above-described problem is obvious especially for the double tire 12 called a flange type in which a flange (not shown) is fixed to the hub 27 and the tires 14 and 15 are fixed to the flange. As for the case in which the spacer 19 is interposed between the inner tire 14 and the outer tire 15 as shown in FIG. 17, the distance in a diameter direction between the spacer 19 and the outer peripheral portion 32A of the rim 32 is small, and therefore the stone removing rod 17 hardly slips in. However, the spacer 19 is not required as a result that the double tire 12 is made a flange type, and therefore such a problem becomes evident.

SUMMARY OF THE INVENTION

The present invention is made in view of the above-described problem, and has its object to provide a foreign matter removing device which hardly damages a tire or interferes with traveling, and is capable of removing foreign matters reliably.

In order to attain the above-described object, a foreign matter removing device according to the present invention is constituted so that in a foreign matter removing device for removing foreign matters caught in spaces of double tires, the foreign matter removing device includes at least one foreign matter removing member interposed in a space of at least one double tire of the double tires, and a dimension in a width direction of the foreign matter removing member in a vicinity of a tip end portion is larger than a dimension in a diameter direction from an outer peripheral portion of a hub, on which at least the one double tire is mounted, to an outer peripheral portion of a rim of at least the one double tire. According to this, the tip end portion of the foreign matter removing member does not slip into the inside of the rim, and therefore the foreign matter removing member, the hub, the rim or the like are hardly broken.

In the foreign matter removing device, the foreign matter removing member is suspended from an upper position into the space of at least the one double tire, and the foreign matter removing member may have such a length that a height of the tip end portion is lower than a height of a center of the hub when a distance in a vertical direction from a mounting position of a base end portion of the foreign matter removing member to the hub becomes maximum. According to this, the tip end portion is lower than the height of the center of the hub in any case, and therefore the tip end portion does not ride over the hub, thus making it possible to remove the foreign matter favorably.

BRIEF DESCRIPTION OF THE DRAWINGS

FIG. 5 is a view showing another constitutional example of the stone removing rod according to the present invention;

FIG. 8 is a view showing another constitutional example of the stone removing rod according to the present invention;

FIG. 9 is an explanatory view of a length of the stone removing rod according to the embodiment;

DETAILED DESCRIPTION OF THE INVENTION

Figure 1:
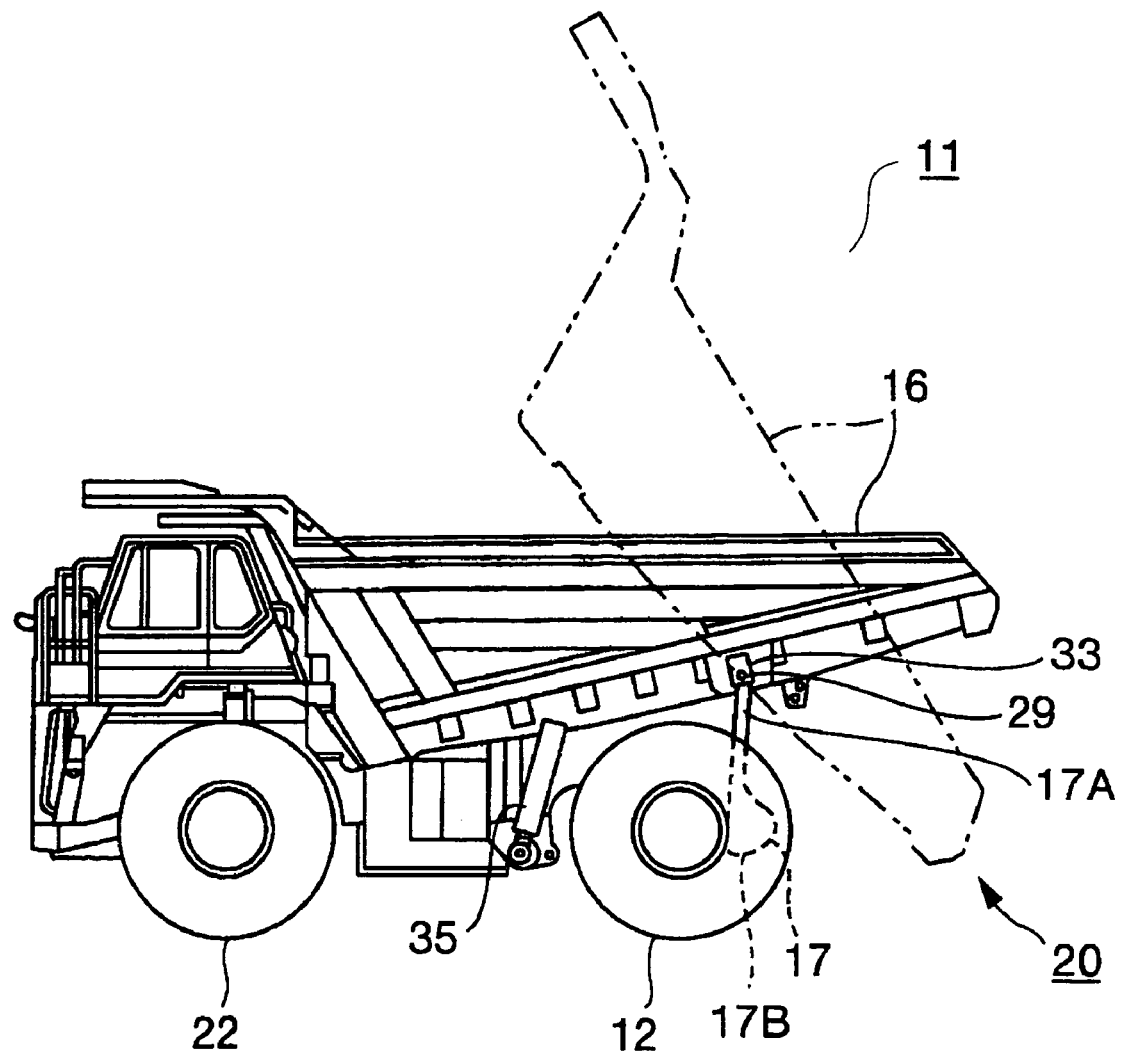
FIG. 1 is a side view of a dump truck according to an embodiment of the present invention.

A preferred embodiment according to the present invention will be explained in detail with reference to the drawings, hereinafter. In FIG. 1, a dump truck 11 includes a vehicle body 20 including front and rear wheels, and a body 16 loaded on an upper part of the vehicle body 20. The body 16 is capable of being raised and lowered by extension and contraction of a body cylinder 35. The front wheels are steering wheels 22 which perform a steering operation, and the rear wheels are double tires 12. In a space of the double tire 12, a stone removing rod 17 according the embodiment is inserted as in FIG. 14.

Figure 2:
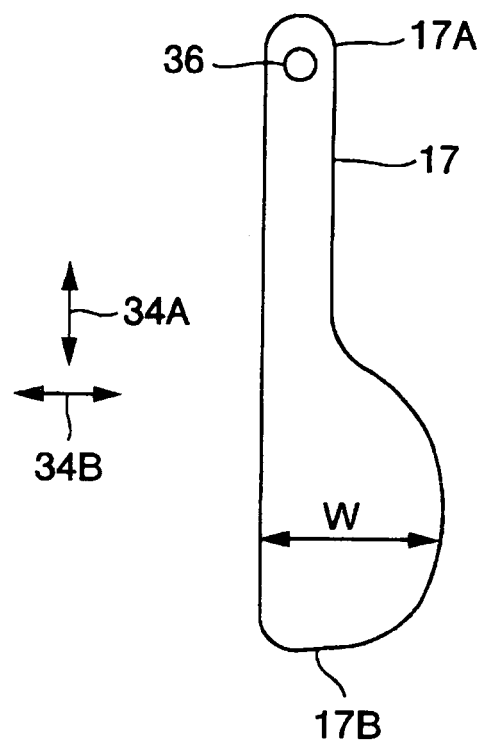
FIG. 2 is a side view of a stone removing rod according to the embodiment.

In FIG. 2, an upper end portion of the stone removing rod 17 is provided with a pin hole 36 into which a fixing pin 29 is inserted. An up-and-down direction in FIG. 2 is called a longitudinal direction (the arrow 34A) of the stone removing rod 17, and a direction perpendicular to the longitudinal direction and approximately corresponding to a traveling direction of the vehicle when the stone removing rod 17 is placed in the space of the double tire 12 is called a width direction (the arrow 34B) of the stone removing rod 17.

An end portion (an upper end portion in FIG. 2) at the side of the pin hole 36 in the longitudinal direction is called a base end portion 17A of the stone removing rod 17, and an end portion at an opposite side from the pin hole 36 in the longitudinal direction is called a tip end portion 17B of the stone removing rod 17. A dimension W in the width direction of the stone removing rod 17 in the vicinity of the tip end portion 17B is called a tip end width dimension W of the stone removing rod 17. As shown in FIG. 2, the tip end width dimension W of the stone removing rod 17 in the embodiment is wider as compared with that in the rod shape of the prior art (see FIG. 14).

Figure 3:
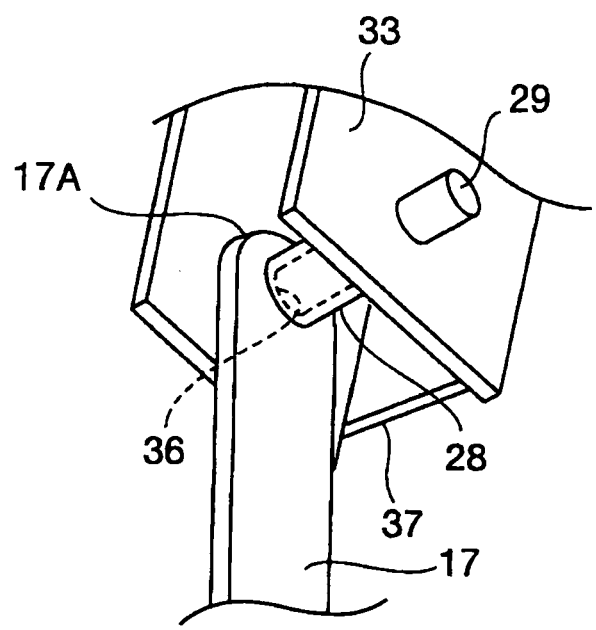
FIG. 3 is a view showing a mounting portion of the stone removing rod according to the embodiment.

FIG. 3 shows a detailed view of a mounting portion of the stone removing rod 17 in the vicinity of the base end portion 17A to the body 16. As shown in FIG. 1 and FIG. 3, the body 16 is provided with a bracket 33 so that the base end portion 17A of the stone removing rod 17 is rotatably mounted via the pin 29. A spacer 28 is fitted on the pin 29, so that the position of the stone removing rod 17 is adjustable corresponding to the position of the space of the double tire 12. The bracket 33 is provided with a stopper 37 to prevent the stone removing rod 17 from colliding against a hub 27.

Figure 4:
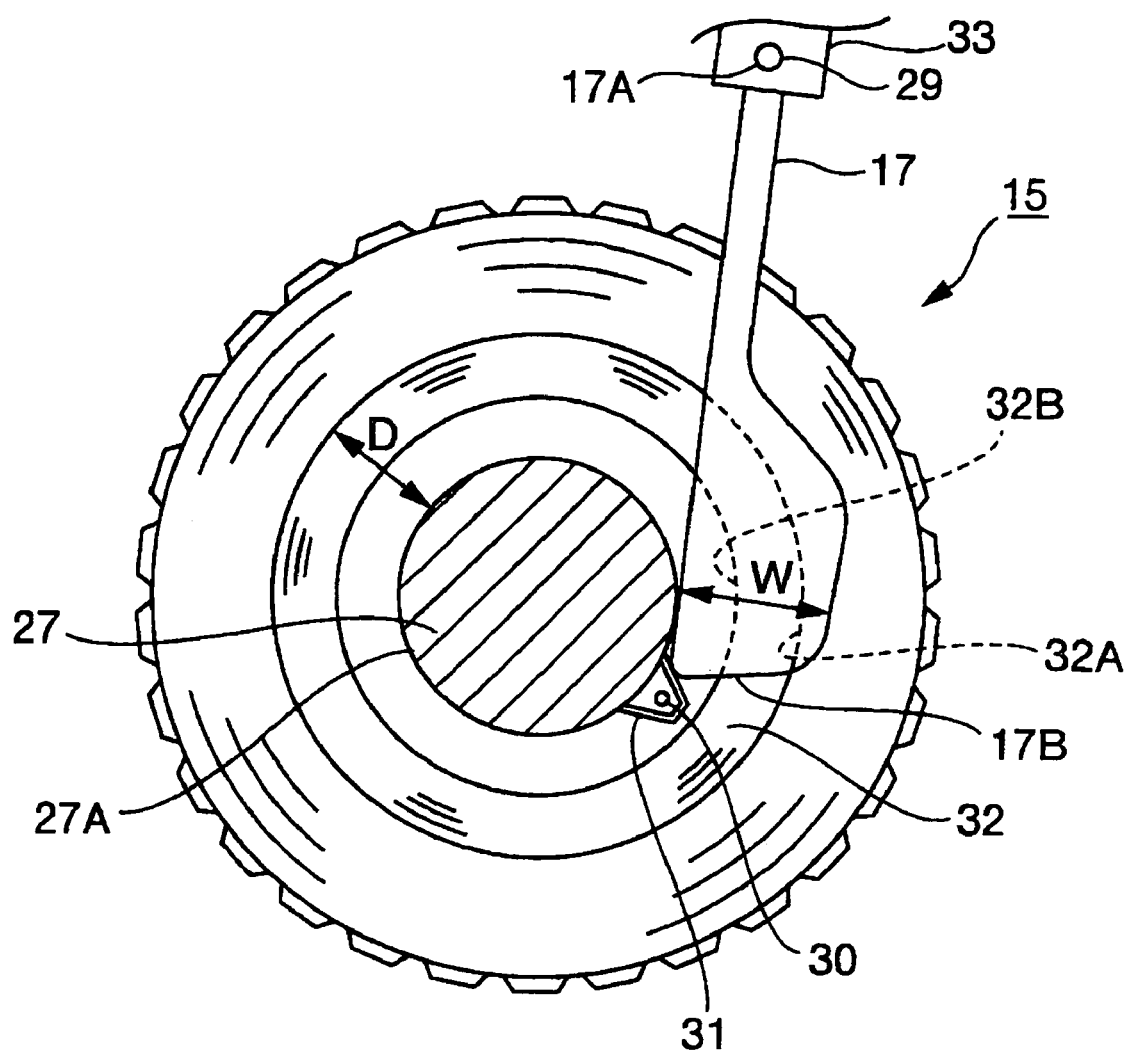
FIG. 4 is a view showing positional relationship of the stone removing rod and a tire, according to the embodiment.
Figure 15:
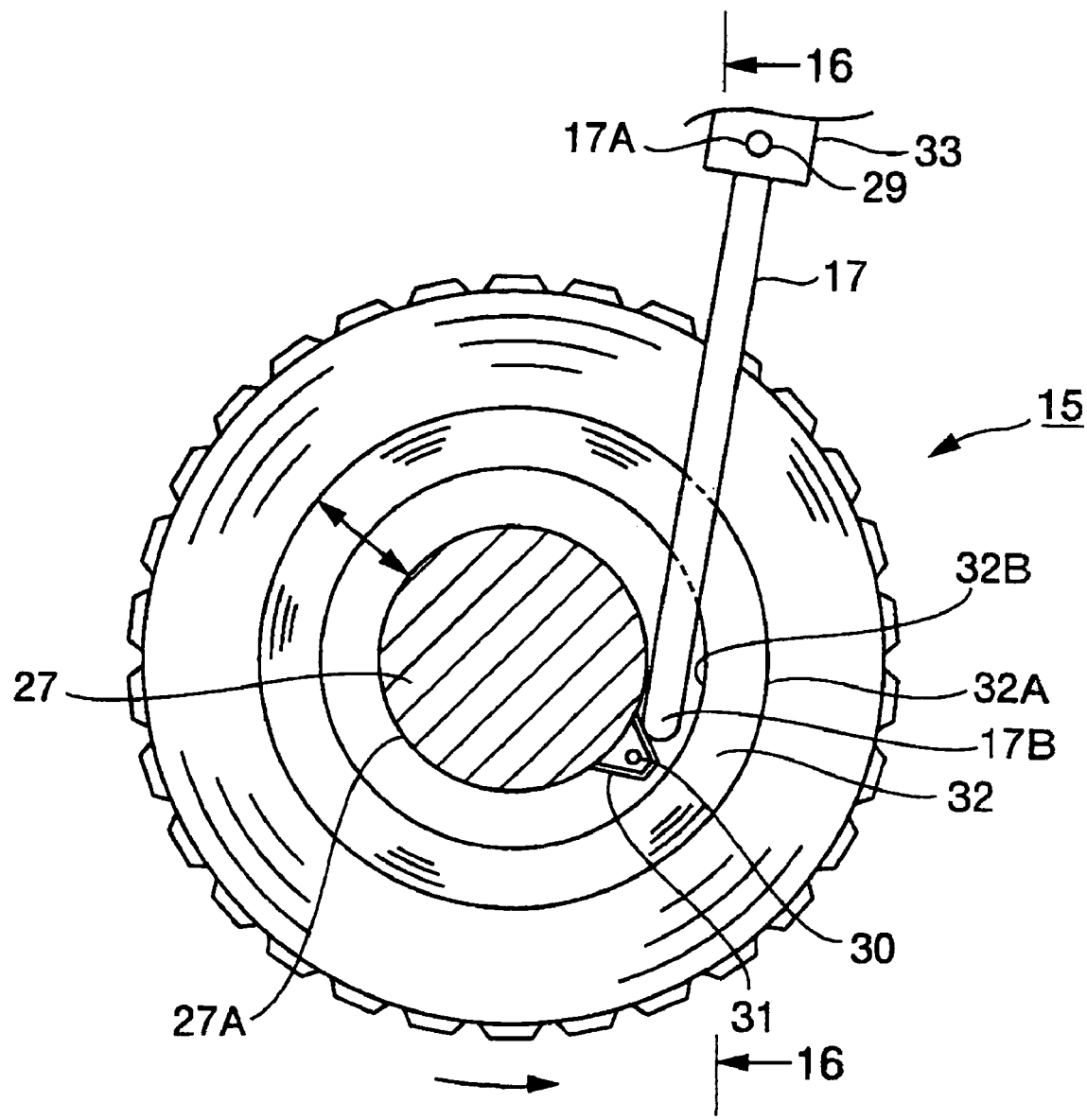
FIG. 15 is a view seen from the line 15—15 in FIG. 14.
Figure 16:
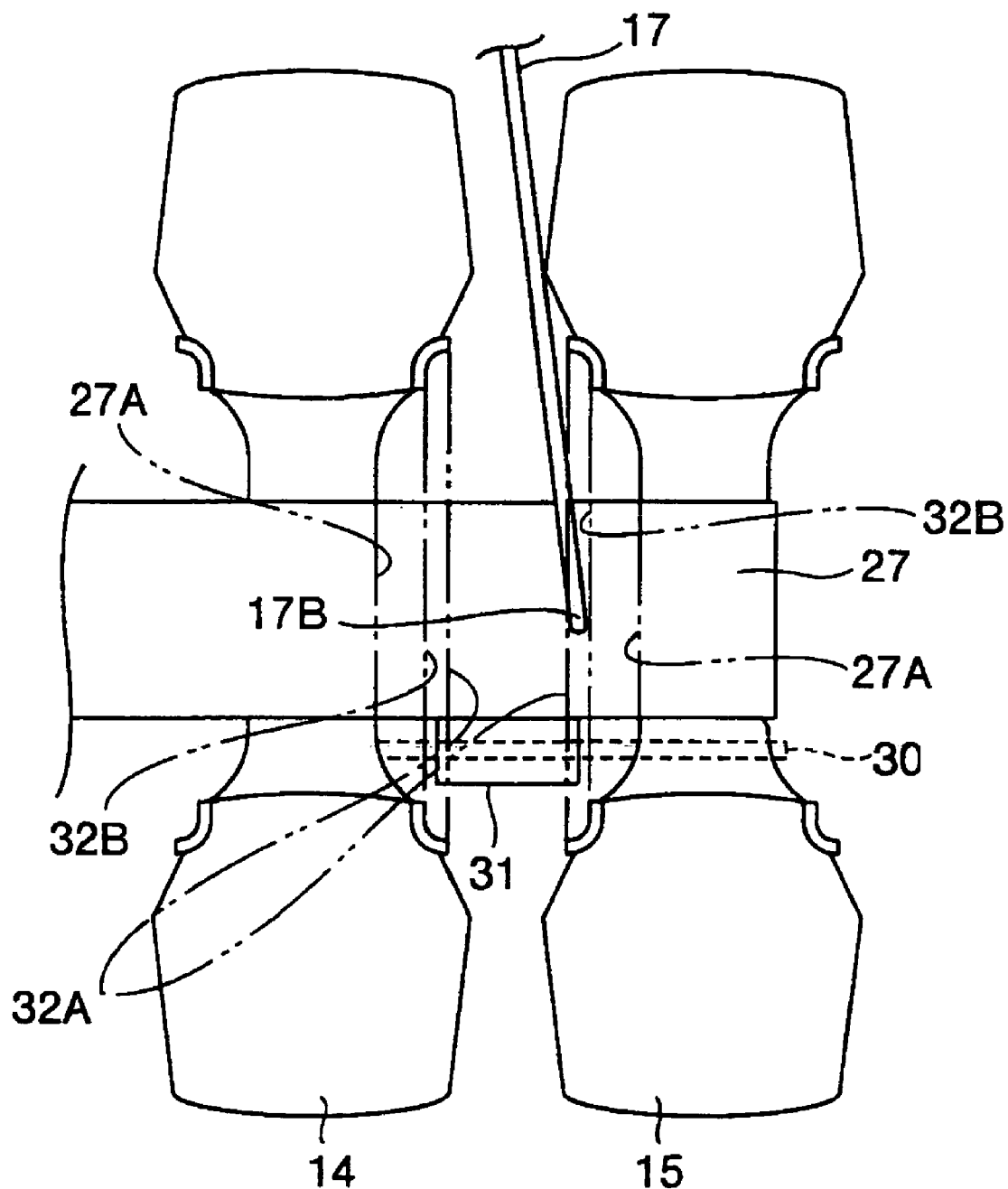
FIG. 16 is a view in which an inner tire is added to a view seen from the line 16—16 in FIG. 15.
Figure 17:
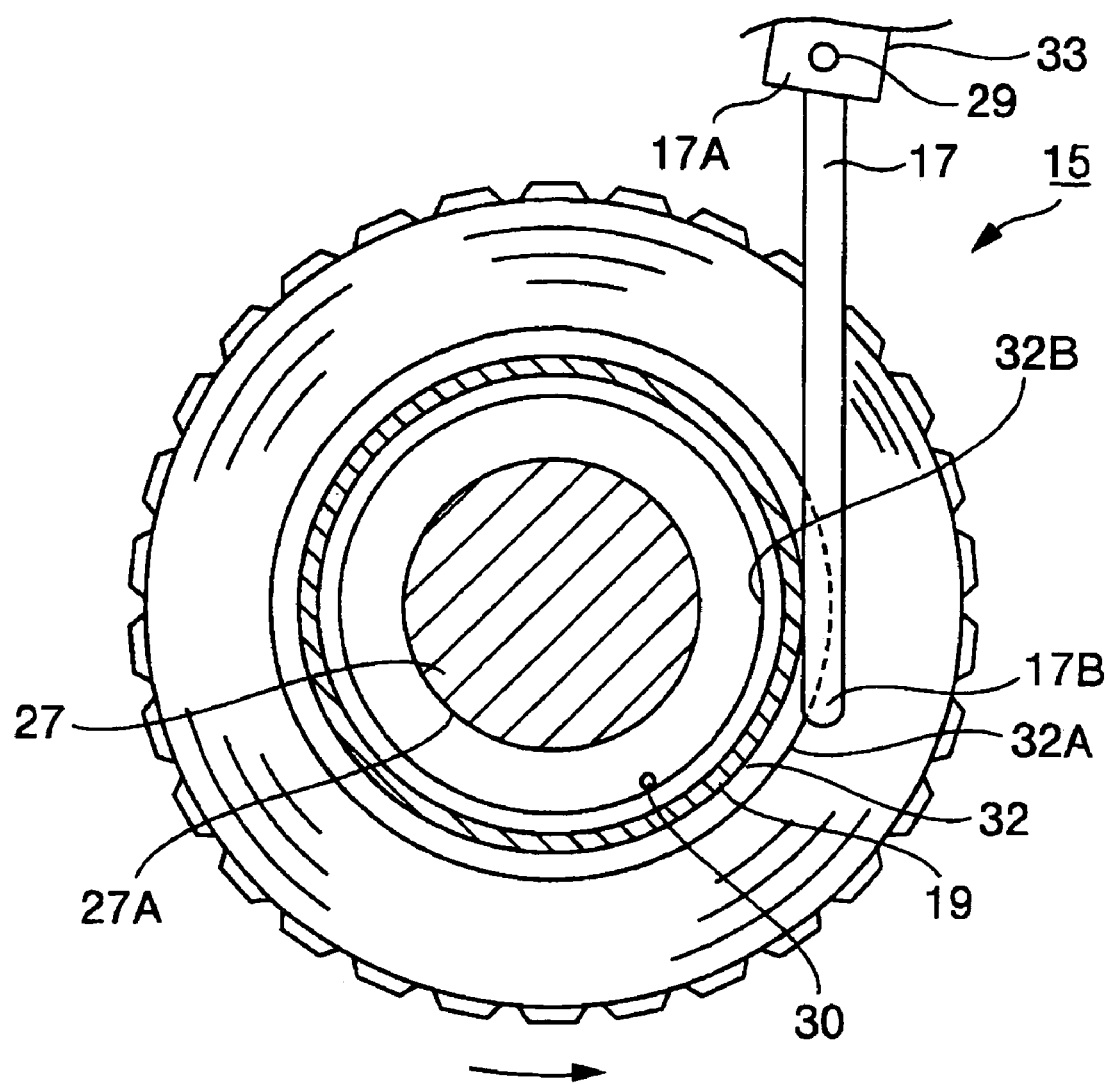
FIG. 17 is an explanatory view of a double tire having a spacer, according to the prior art.

FIG. 4 shows positional relationship of the stone removing rod 17 and the outer tire 15 when the stone removing rod 17 according to the embodiment as shown in FIG. 2 is used. In FIG. 4, the outer tire 15 and the stone removing rod 17 are seen from the same position as in FIG. 15. The positional relationship of the stone removing rod 17 and the inner tire 14 is approximately the same as in FIG. 4.

As shown in FIG. 4, in the embodiment, the tip end width dimension W of the stone removing rod 17 is larger than the dimension (hereinafter, called an inside dimension D of the rim 32) in a diameter direction of an outer peripheral portion of the hub 27 to an outer peripheral portion of a rim 32. As a result, the stone removing rod 17 does not slip in between an outer peripheral portion 27A of the hub 27 and an inner peripheral portion 32B of the rim 32, between the inner peripheral portion 32B of the rim 32 and an outer peripheral portion 32A of the rim 32, or between the outer peripheral portion 27A of the hub 27 and the outer peripheral portion 32A of the rim 32, or the like. The tip end portion 17A of the stone removing rod 17 may be partially hollowed out for weight reduction. According to the above constitution, it hardly happens that any of the stone removing rod 17, the rim 32, the air pipe 30 and the cover 31 is broken.

Figure 6:
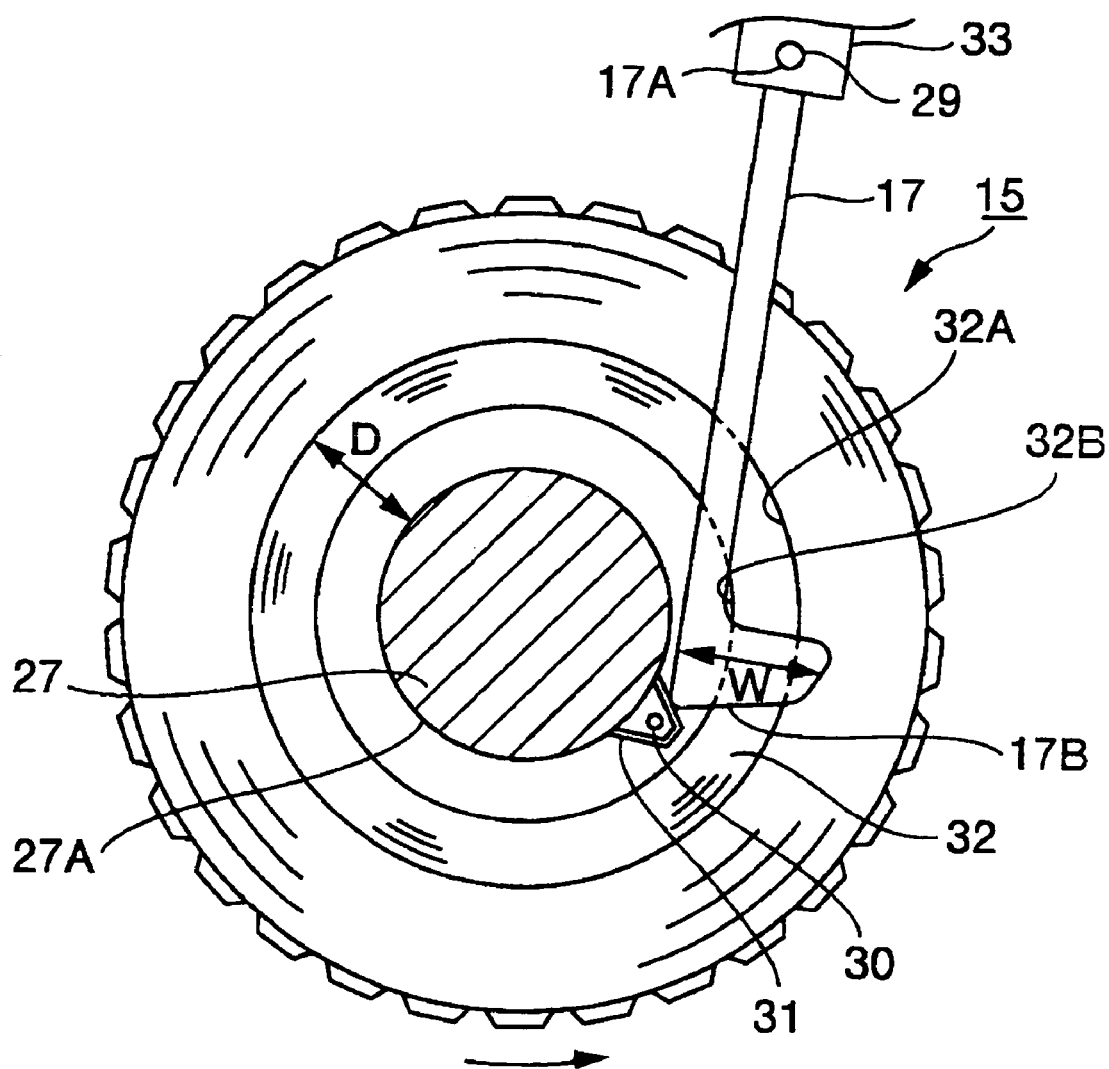
FIG. 6 is a view showing another constitutional example of the stone removing rod according to the present invention.
Figure 7:
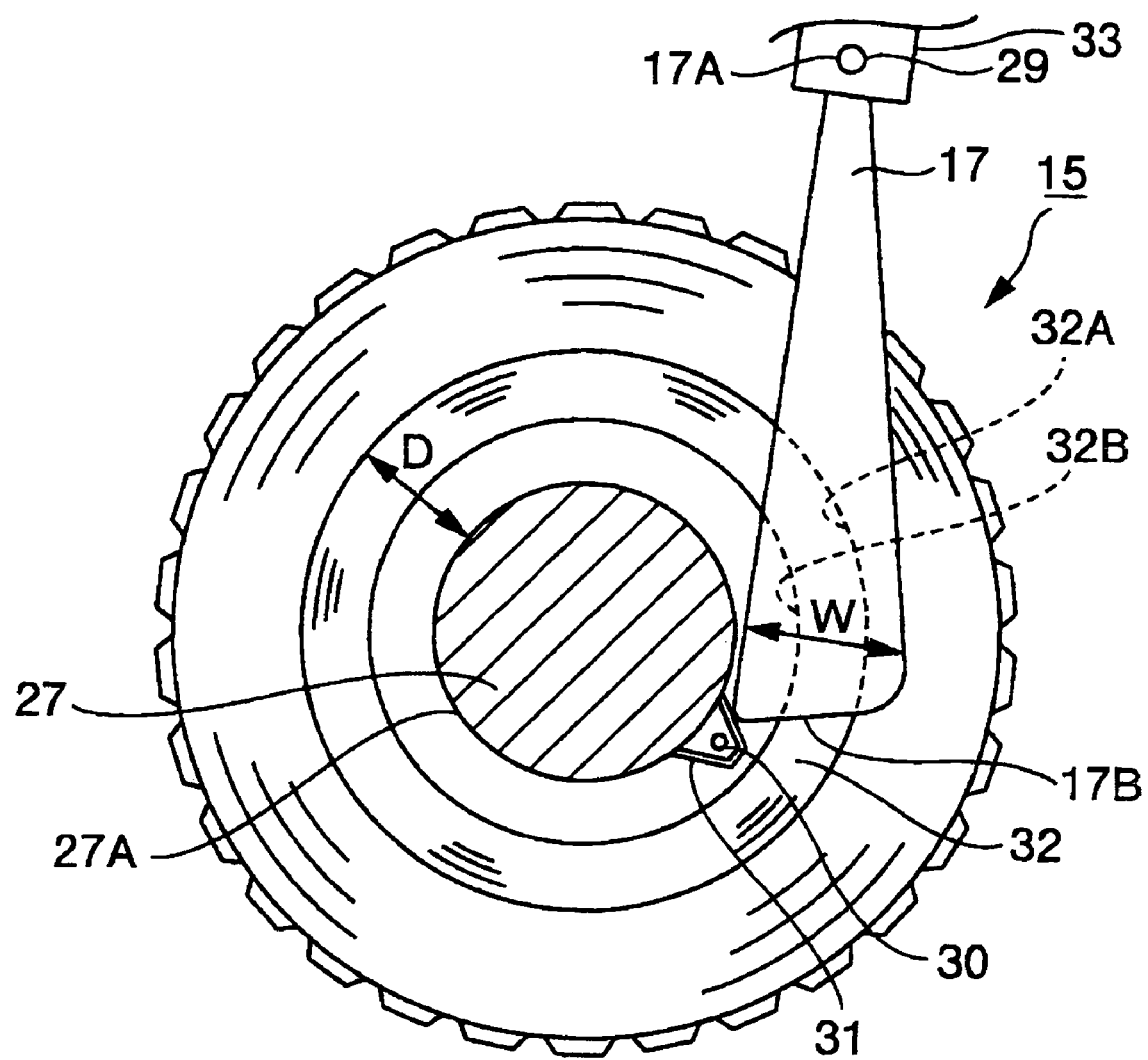
FIG. 7 is a view showing another constitutional example of the stone removing rod according to the present invention.

Another constitution example of the stone removing rod 17 will be shown in FIG. 5 to FIG. 8. As shown in FIG. 5, the stone removing rod 17 may be constructed by combining a rod-shaped member and an arc-shaped member so that the tip end width dimension W becomes larger than the inside dimension D of the rim 32. As shown in FIG. 6, the stone removing rod 17 may be an L-shaped member. As shown in FIG. 7, the stone removing rod 17 may be made approximately triangular, or may be formed into a tear drop shape. As shown in FIG. 8, the tip end portion 17B may be formed into a shape which is wide approximately symmetrically with respect to the longitudinal direction of the tip end portion 17B.

Alternatively, though not shown, the stone removing rod 17 has approximately the same tip end width dimension W from the base end portion 17A to the tip end portion 17B, and the tip end width dimension W may be made larger than the inside dimension D of the rim 32. In this manner, in the various shapes, the tip end width dimension W of the stone removing rod 17 is made larger than the inside dimension D of the rim 32, and thereby the stone removing rod 17 can be prevented from slipping into the inside of the rim 32.

When the tip end width dimension W is mentioned, it is not limited to the width dimension of the stone removing rod 17 in the region at the foremost end, but it is obvious as shown in FIG. 4 to FIG. 8 that the tip end width dimension W may be the width in the vicinity of the tip end portion 17B. Namely, in the region where there is the possibility that the stone removing rod 17 slips in between the outer peripheral portion 32A of the rim 32 and the outer peripheral portion 27A of the hub 27, it is sufficient if the dimension in its width direction is larger than the dimension between the outer peripheral portion 32A of the rim 32 and the outer peripheral portion 27A of the hub 27.

Figure 14:
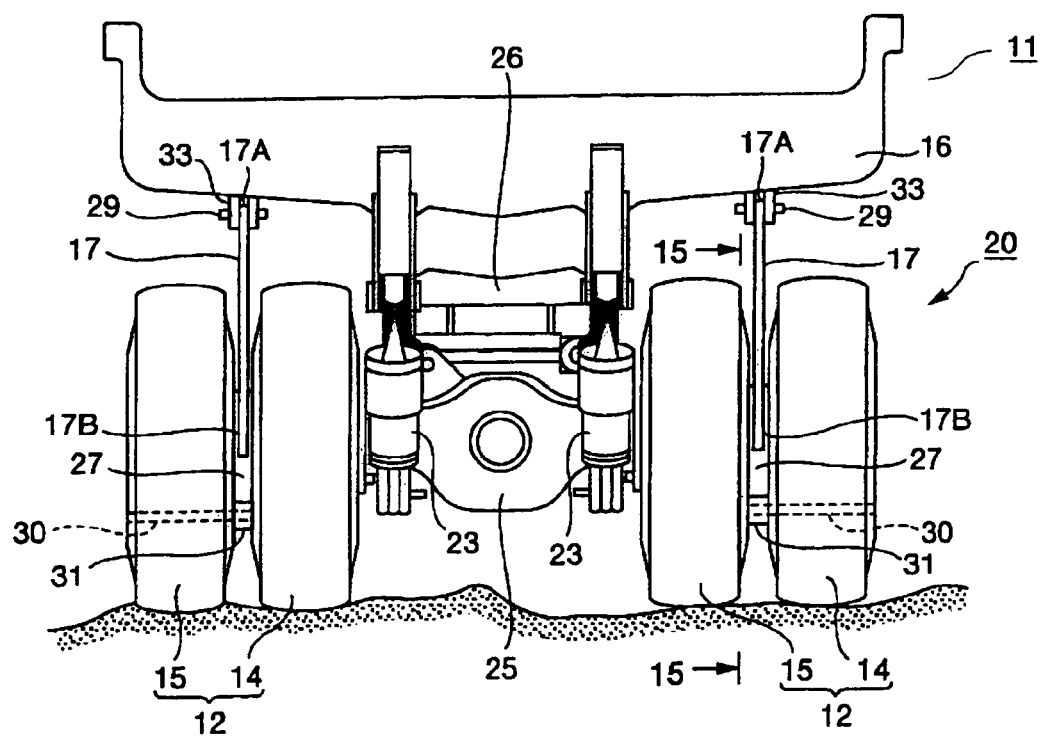
FIG. 14 is a rear view of a dump truck according to the prior art.

Next, a preferable length of the stone removing rod 17 will be explained. As shown in FIG. 14, in the dump truck 11, a distance in the vertical direction between the body 16 and the hub 27 is designed to change via a rear suspension 23 so that the dump truck 11 can comfortably travel even on the ground with ups and downs.

Furthermore, the dump truck 11 sometimes travels in the state in which the body 16 is in the earth discharging posture (dump up) as shown by the two-dot chain line in FIG. 1. In such a case, the distance in the vertical direction between the body 16 and the hub 27 also changes. As a result, during traveling, the tip end portion 17B of the stone removing rod 17 moves up and down with respect to the hub 27 and the rim 32. A preferable range for the length of the stone removing rod 17 also exists so that the stone removing rod 17 removes foreign matters and is not broken in such a case.

First, the state in which the body 16 moves upward away from the hub 27, and the tip end portion 17B of the stone removing rod 17 is raised highest will be explained. In FIG. 9, the positional relationship of the stone removing rod 17 and the outer tire 15 seen from the same position as in FIG. 4 in the state in which the tip end portion 17B of the stone removing rod 17 is raised highest is shown by the solid line. Approximately the same thing also applies to the inner tire 14.

As shown by the solid line in FIG. 9, if the length of the stone removing rod 17 is too short, the tip end portion 17B of the stone removing rod 17 sometimes reaches an upper position than the hub 27 when the body 16 moves upward away from the hub 27. As a result, the tip end portion 17B of the stone removing rod 17 collides against the hub 27 from above, or the tip end portion 17B of the stone removing rod 17 moves forward of the hub 27 as shown by the arrow 38.

In view of the above, it is necessary that the stone removing rod 17 has a length in which the tip end portion 17B is always located behind the hub 27 even when the body 16 is located a the uppermost position. It is desirable that the position where the stone removing rod 17 contacts the hub 27 is lower than a center line in the horizontal direction of the hub 27 so that the stone removing rod 17 does not ride over the hub 27 and does not move forward of the hub 27 by the shock from the collision against a foreign matter when the foreign matter caught in the space of the double tire 12 rotates with the double tire 12. Due to this, the foreign matter can be favorably sprung out of the double tire 12. In this manner, the smallest length of the stone removing rod 17 is determined.

Next, the maximum allowable length of the stone removing rod 17 will be explained. As shown in FIG. 9, if the stone removing rod 17 shown by the two-dot chain line is too long, the stone removing rod 17 sometimes contacts the ground when the distance in the vertical direction between the body 16 and the hub 27 becomes the smallest. In view of this, it is necessary to make the stone removing rod 17 have the length with which the stone removing rod 17 does not contact the ground in any case.

Figure 10:
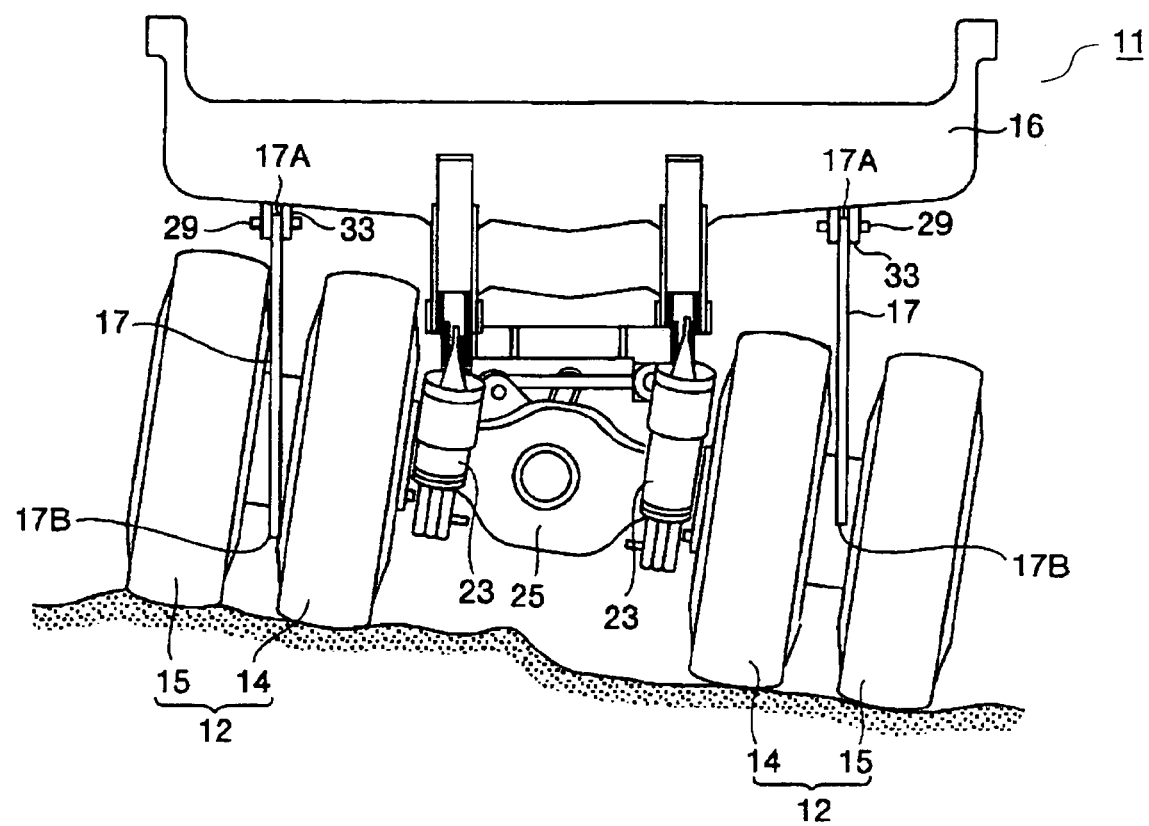
FIG. 10 is a rear view of a dump truck according to the embodiment.
Figure 11:
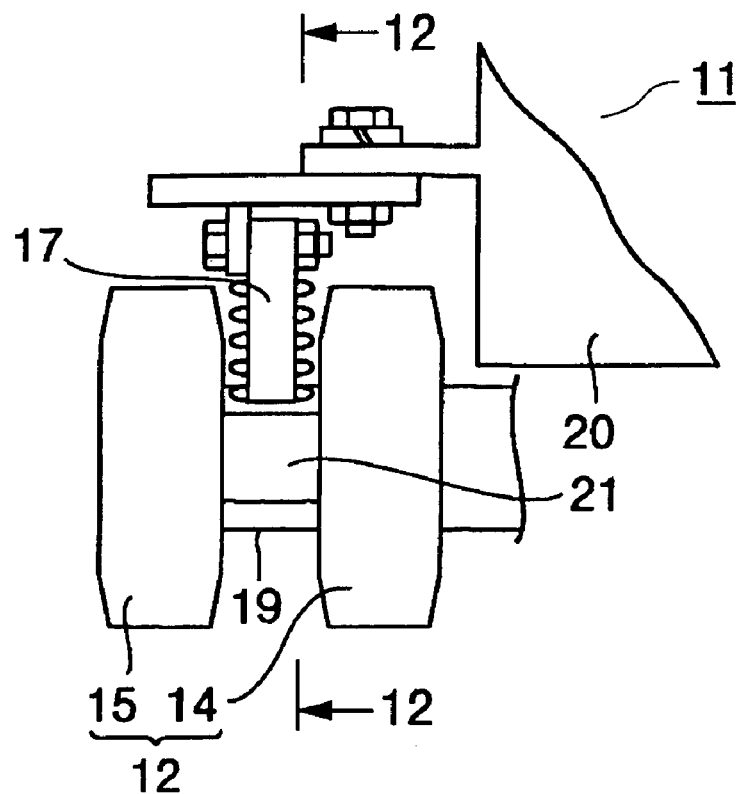
FIG. 11 is an enlarged view of a front of a vehicle to which a foreign matter removing device according to a prior art is mounted.
Figure 12:
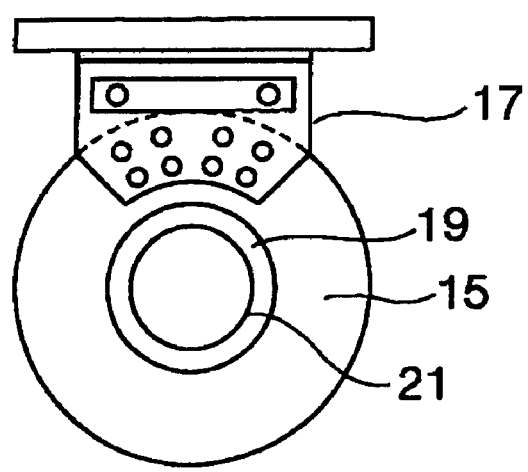
FIG. 12 is a sectional view taken along the line 12—12 in FIG. 11.
Figure 13:
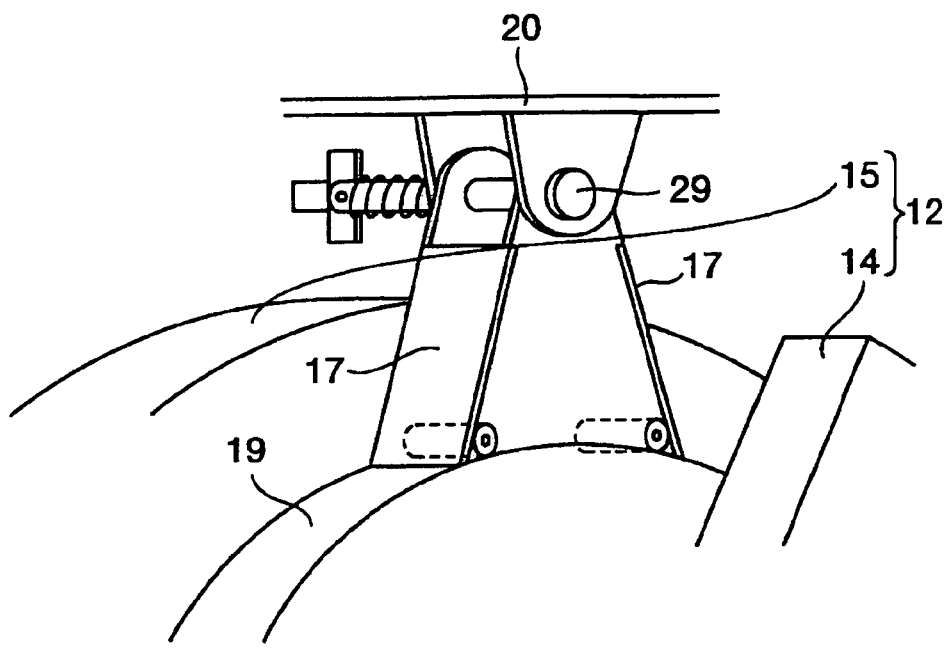
FIG. 13 is a side view of a vehicle to which a foreign matter removing device according to another prior art is mounted.

As shown in FIG. 10, when the dump truck 11 travels on the ground different in height at the left and the right, the double tire 12 inclines with respect to the ground, and the suspensions at the left and the right extend and contract individually, thus causing oscillation. If the stone removing rod 17 is too long at this time, the stone removing rod 17 sometimes slips into the space of the inclined double tire 12 and is bent. Therefore, as shown in FIG. 10, it is desirable that the stone removing rod 17 has the length with which it is not bent even in the state in which the inclination of the double tire 12 becomes the maximum.

As explained thus far, according to the present invention, the vicinity of the tip end portion 17B of the stone removing rod 17 is made wide. As a result, the stone removing rod 17 is not caught in between the rim 32 and the hub 27, and it hardly happens that the stone removing rod 17, the rim 32 and the hub 27 are damaged. The above-described explanation is made with the dump truck being taken as an example, but the present invention is totally similarly applicable to the working vehicle 11 including the double tire 12 such as a fork lift. Further, the above-described explanation is made about the device in which the stone removing rod 17 is suspended into the space from above, but the present invention is not limited to this. The present invention can be applied to the various modes such as the mode in which the stone removing rod extends toward the hub or its peripheral area from the front or the rear, for example.

The outer diameters of the hub 27 for mounting the inner tire 14 and the outer tire 15 are described as the same in the double tire 12, but the present invention is not limited to this. The dimensions of the rims 32 of the inner tire 14 and the outer tire 15 are described as the same, but the present invention is not limited to this. Namely, when the diameter direction dimensions D from the outer peripheral portion of the hub 27 to the outer peripheral portion of the rim 32 differ in the inner tire 14 and the outer tire 15, the tip end width dimension W is set to be larger than the larger one of the two diameter direction dimensions D.

What is claimed is:

1. A foreign matter removing device for removing foreign matter caught in a space between tires of a double tire which is mounted on a hub of a vehicle, said device comprising:
   a foreign matter removing member interposed in the space between tires of the double tire such that a tip end portion of the foreign matter removing member is positioned behind the hub in a traveling direction of the vehicle;
   wherein a width, in the traveling direction of the vehicle, of at least a widened portion of the tip end portion of the foreign matter removing member is larger than a distance, along a diameter of the double tire, from an outer peripheral portion of the hub to an outer peripheral portion of a rim of the double tire.

2. The foreign matter removing device according to claim 1, wherein the foreign matter removing member is suspended from a base end portion thereof, which is mounted at a mounting portion that is at an upper position in a vertical direction with respect to the tip end portion, into the space between tires of the double tire; and
   wherein the foreign matter removing member has a length such that a height of the tip end portion is lower than a height of a center of the hub when a distance in the vertical direction from the mounting position to the center of the hub is at a maximum.

3. The foreign matter removing device according to claim 1, wherein the widened portion of the tip end portion is provided at least partially below a top portion of the hub in a vertical direction.

4. The foreign matter removing device according to claim 2, wherein the widened portion of the tip end portion is provided at least partially below a top portion of the hub in a vertical direction.

* * * * *